US009628370B1

(12) United States Patent
Noureddine et al.

(10) Patent No.: US 9,628,370 B1
(45) Date of Patent: *Apr. 18, 2017

(54) METHOD FOR EFFICIENT ROUTING IN A NETWORK INTERFACE CARD

(71) Applicant: Chelsio Communications, Inc., Sunnyvale, CA (US)

(72) Inventors: Wael Noureddine, Santa Clara, CA (US); Asgeir Thor Eiriksson, Sunnyvale, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/179,710

(22) Filed: Jun. 10, 2016

Related U.S. Application Data

(63) Continuation of application No. 13/330,513, filed on Dec. 19, 2011, now Pat. No. 9,390,056.

(51) Int. Cl.
*H04L 12/40* (2006.01)
*H04L 12/761* (2013.01)
*H04L 12/707* (2013.01)
*H04L 29/08* (2006.01)

(52) U.S. Cl.
CPC ............ *H04L 45/16* (2013.01); *H04L 45/24* (2013.01); *H04L 67/2861* (2013.01); *H04L 67/2866* (2013.01)

(58) Field of Classification Search
None
See application file for complete search history.

(56) References Cited

U.S. PATENT DOCUMENTS

| | | | |
|---|---|---|---|
| 9,197,576 B2* | 11/2015 | Balasubramanian | H04L 12/4015 |
| 2003/0200315 A1* | 10/2003 | Goldenberg | H04L 47/10 709/225 |
| 2010/0223658 A1* | 9/2010 | Narasimhan | G06F 21/554 726/4 |
| 2011/0149966 A1* | 6/2011 | Pope | H04L 49/30 370/392 |
| 2012/0151004 A1* | 6/2012 | Pope | G06F 13/102 709/219 |
| 2013/0080567 A1* | 3/2013 | Pope | G06F 13/385 709/213 |

* cited by examiner

*Primary Examiner* — Natisha Cox
(74) *Attorney, Agent, or Firm* — Beyer Law Group LLP (57) ABSTRACT

Packet switching is facilitated between a source and a destination through a network interface card. In accordance with an aspect, a NIC is configured to switch ingress packets—coming from the network—selectively to one or multiple destinations (in a NIC which is capable of replicating packets) on the host computer, and alternatively or additionally (in a NIC which is capable of replicating packets) back to one or multiple destinations on the network. In multi-port NICs, this capability effectively allows a NIC to perform the basic functions of a standalone network switch as well as additional useful functions.

25 Claims, 3 Drawing Sheets

METHOD FOR EFFICIENT ROUTING IN A NETWORK INTERFACE CARD

This application is a Continuation of co-pending application Ser. No. 13/330,513 filed Dec. 19, 2011, and which is hereby incorporated by reference in its entirety.

TECHNICAL FIELD

The present invention relates to packet switching and processing in a packet network interface card.

BACKGROUND

A Network Interface Controller (NIC)—which may be, for example, network interface circuitry, such as on a PCI card connected to a host computer via a PCI host bus—is typically used to couple the host computer to a packet network through at least one NIC interface, called a port. Recently, the growth in host virtualization has led to additional functionality being performed by virtualization-aware NICs. One class of such functionality is packet switching, which allows multiple virtual operating systems or guest operating systems on a host system to communicate with each other through a NIC attached to the computer system. A related standardization effort of virtual machine switching is under way.

SUMMARY

Packet switching is facilitated between a source and a destination through a network interface card. In accordance with an aspect of the invention, a NIC is configured to switch ingress packets—coming from the network—selectively to one or multiple destinations (in a NIC which is capable of replicating packets) on the host computer, and alternatively or additionally (in a NIC which is capable of replicating packets) back to one or multiple destinations on the network. In multi-port NICs, this capability effectively allows a NIC to perform the basic functions of a standalone network switch as well as additional useful functions.

DETAILED DESCRIPTION

The inventors have realized a novel application of the switching capability of a NIC—namely the switching of ingress packets—coming from the network—selectively to one or multiple destinations (in a NIC which is capable of replicating packets) on the host computer, and alternatively or additionally (in a NIC which is capable of replicating packets) back to one or multiple destination on the network. In multi-port NICs, this capability effectively allows a NIC to perform the basic functions of a standalone network switch as well as additional useful functions. Within this patent application, the terms "frame" and "packet" are used interchangeably. While convention is to refer to Ethernet "frames," but to IP "datagrams" and TCP "segments" and in general to network "packets," these two terms—i.e. frames and packets—are used somewhat interchangeably because the data represented by these terms is, in many places, treated somewhat interchangeably. For any particular example, the characteristic of the actual data being processed/handled is evident from the context.

Furthermore, a rich set of operations may be performed on a packet, including replicating packets, before a packet is sent towards its destination. Such operations include full or partial header removal, full or partial header rewrite (e.g., to implement router functionality), header insertion, full or partial payload removal, payload insertion or other payload processing, partial or full protocol processing and packet segmentation. The particular processing applied may depend on the results of a look up using some information present in the packet or a look up using information computed in part or in full based on information present in the packet, and may additionally or alternately depend on other information internal to the NIC.

In some examples, such an operation performed on a packet includes replicating of partial packet contents, such as for high speed tracing of critical packet information in headers.

In some examples, different processing may be performed on different copies of the replicated packets originating from a single received packet. For example, one replicated packet may be provided to the host, one provided to an output port for transmission to a remote monitor, and one passed through the NIC (routed). In some examples, an operation performed on a replicated packet includes associating with a replicated packet, a virtual identifier (VI) derived from the received packet, for example derived from the destination Ethernet address in the received packet, and then providing the replicated packets to the ingress pipeline of the NIC with a tuple including the VI. A filter rule can be written for each VI and each filter can specify a particular action. The discussion henceforth will consider an Ethernet network as an example of a packet switched network where this use of a NIC switching capability may be applied, though other types of packet-switched networks/protocols may be employed as well.

The NIC can do multi-layer (referring to the OSI layered network model) processing, such as L2-L7 processing, on a packet (for both ingress and egress directions). In particular, the NIC may parse the various headers and can be programmed via the host system with various packet characteristic criteria—to modify the packet contents, or drop the packet or send the packet for further processing in the host, transparently (e.g, by replication) or not (e.g., by extracting the packet from the ingress stream). In some cases, ingress packets are packets that were egress packets but, upon egress, it was determined that the destination address (e.g., at Layer 2) is such that the egress packet is destined to the same NIC, is for example being sent from one virtual machine to another virtual machine on the host connected to the NIC, in which case the egress packet is then looped back to the NIC for ingress processing (including Layer 2 processing) as if the packet had been received at an input port of the NIC. In this case, the NIC performs processing like that of an L2 Ethernet switch. The egress to ingress switching determination step may also consider fields at layers above L2. In this case, the NIC performs processing that goes beyond that of an L2 Ethernet switch. Furthermore, an ingress packet which was an egress packet can be sent on an egress port following the ingress processing step. Multiple such iterations through the NIC may occur, and can be useful to perform cascaded operations on the packets.

Thus, for example, the NIC may accomplish, in a unified manner, functions such as routing, switching and firewall functions, in addition to other functions that may typically be handled by a NIC—such as TCP or other layer 2/3 protocol offload, layer 2 protocol endpoint processing, etc.

Figure 1:
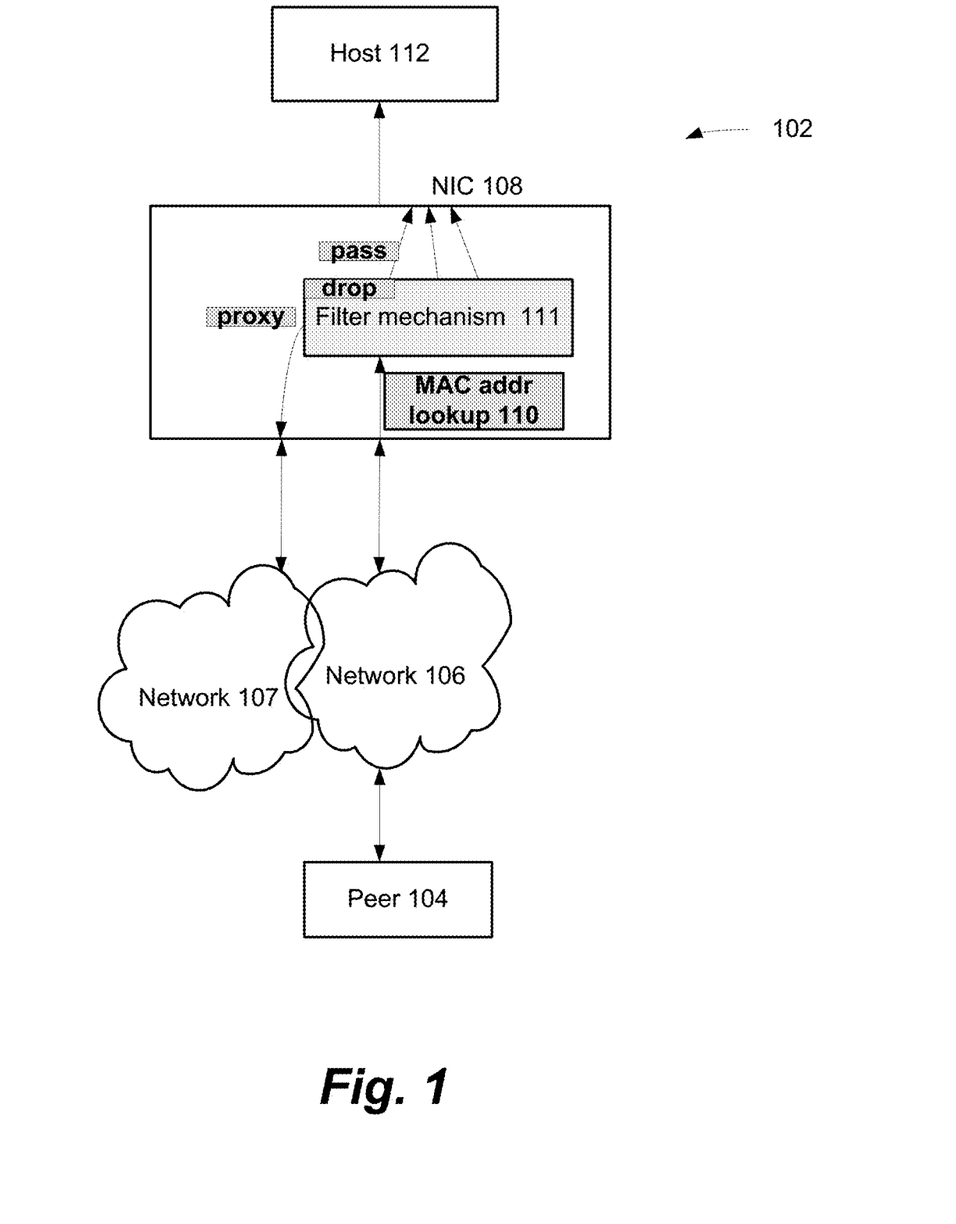
FIG. 1 is a block diagram illustrating a host system with a network adapter configured to, based on a least a portion of a packet received on one of a plurality of ports, indicate a destination of the packet or a replica thereof that is at least one of any one of the ports and/or any of receive queues for providing the packet to the host.

FIG. 1 is a block diagram illustrating an example host system 102 including a host 112 with a network adapter (NIC 108) configured to, based on at least a portion of a packet received on one of a plurality of ports, indicate a destination of the packet that is at least one of any one of the ports and/or any of receive queues for providing the packet (or data resulting from protocol processing the packet) to the host, or a "null" interface to drop the packet. The FIG. 1 NIC includes capability to perform initial MAC address level filtering 110 on an input packet received (such as from a peer 104 via a network 106), depending on a setting of a configurable promiscuous mode of the NIC 108. Thereafter, a filter mechanism 111 includes capability to pass, drop or proxy a packet depending on a classification of the packet as determined using an n-tuple of the information in the packet. The proxied packets are sent to network 107, which could be different from network 106. Following, we discuss this network adapter capability in more detail, with reference to examples.

Classification and Filtering refer to a sequence of processing steps involving the determination of information based at least in part on the packet, and based on a result of a lookup using this information in pre-programmed classification tables to perform further processing of the packet.

In accordance with an example embodiment, a packet input on a port of the network interface controller is processed and, based thereon, either switched to be output or provided to a receive queue of the host (to be thereby provided to the host), or protocol processed by the NIC and a result of the protocol processing provided to the host and/or proxied to a peer. Furthermore, as a preliminary step, it may be determined if the network interface controller is to even accept a frame that includes the input packet to be processed. For example, it may be determined if the MAC address in the frame matches a MAC address in an accept list. If the MAC address matches, then the frame is accepted. Otherwise, if the MAC address does not match, it is dropped, unless the NIC is in a promiscuous mode.

Next, a filter lookup is performed based on characteristics of the ingress packet. The filter lookup is an n-tuple classification feature, which can be used in the ingress path to, for example:

Steer ingress packets that meet ACL (Access Control List) accept criteria to a particular receive queue on the host.

Protocol process ingress packets that meet ACL accept criteria, and deliver a result of the processing to a particular receive queue on the host.

Switch (proxy) ingress packets that meet ACL accept criteria to an output port, with optional header rewrite and network address translation NAT (IPv4/IPv6 addresses and TCP/UDP ports).

Drop ingress packets that fail ACL accept criteria.

The filter may be implemented by configuring space for classification/filter rules within the LE ("lookup engine") lookup table (an example implementation of which is a TCAM), and initializing the filter rule state at the index value corresponding to the rule with classification/filter rule specific information.

The classification n-tuples may be priority encoded such that, when there are multiple hits in the LE classification/filter region, then the index for the matching rule with the lowest index value within the classification/filter region is returned. The ACL processing of ingress packets can be enabled separately (e.g., in a configuration register). There can be multiple DROP rules within the LE and matching such a rule indicates that a packet should be dropped, whereas the PASS and PROXY rules are stored only within a control block that is accessed using the matching rule index. This arrangement allows ACL processing in conjunction with offloaded connections, i.e. an incoming TCP SYN (connect request) can be classified for PASS/DROP and then when PASS is indicated, the LE can look up an offloaded listening server. (See U.S. Pat. No. 7,760,733 for a description of an example LE operation including the lookup of an offloaded listening server.)

The n-tuple classification feature uses, for example, 512 MAC Ethernet exact match address filters and 256 hashed Ethernet address (partial) match filters in the MPS (Multi Purpose Switch), and the TP (Transport Processor) parser then extracts information from each ingress Ethernet packet and passes it to the classification engine that looks up the n-tuple in the filter region within the LE TCAM.

Figure 2:
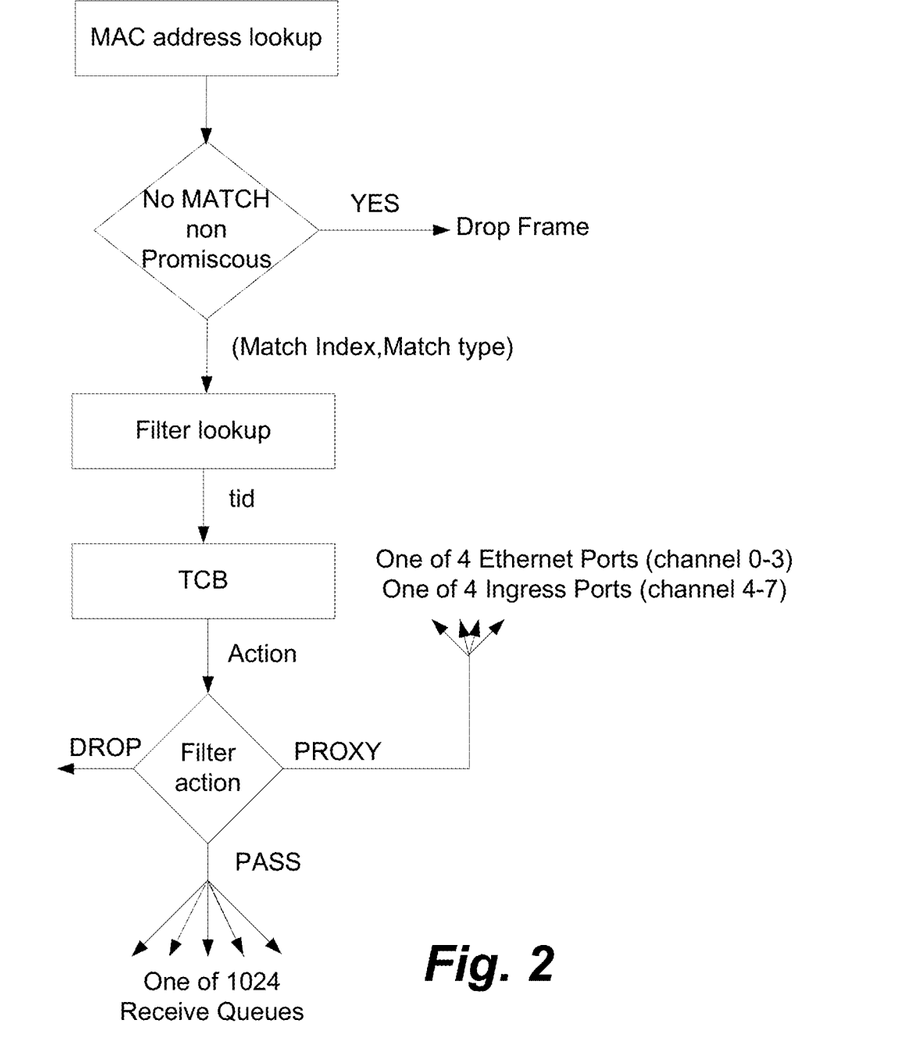
FIG. 2 is a flowchart illustrating an example of the process that may be followed in the FIG. 1 network adapter.

We now describe an example ingress path processing in greater detail, with reference to FIG. 2. As shown in FIG. 2, in the incoming frame, the frame destination MAC address is looked up in a MAC address matching table. The incoming frame is parsed, and the MAC address match described above is performed, for example, at the speed of the incoming frame, such as 10 Gbps network speed.

The parser may extract the following, for example, from the incoming frame: EtherType, ingress Port number, Outer VLAN, Inner VLAN, Protocol, Local IP Address (LIP), Local port number (LP), Foreign/Peer IP address, Foreign/Peer Port number (FP). The parser may also derive additional fields based in part on the extracted fields, such as derive a PCI Virtual Function number VF and PCI Physical Function number PF. The choice between some fields, for example Outer VLAN or VF, PF may be selected, by a control process, through a configuration register of the NIC that is accessible to the control process.

It may be beneficial (economical) to produce a compressed tuple string by selecting and concatenating the information above using the setting of a register. Different possible values of this register may be set to select the different fields in the filter tuple. The compressed tuple string may be looked up in a rule database; any of the tuples can have a wildcard value. In one example, there are 256 rules in a standard configuration (with up to 2048 rules possible). The lookup is done at the ingress (e.g., 10 Gbps) line rate, and the result is a value for "index tid."

The matching rule is obtained (at index tid), and the rule specifies an action: DROP/PASS/OFFLOAD/PROXY. If the rule specifies PASS (Deliver), the Queue Number for the received packet is fetched for the rule. If the rule specifies OFFLOAD, the ingress packet is protocol processed according to a network protocol such as TCP/IP and a result of the processing may be delivered to a Queue Number specified in the rule. If the rule specifies PROXY, an egress packet is re-injected into the egress processing path after optionally re-writing the MAC header, VLAN, and/or TCP/UDP port fields. It is possible to construct rich processing rules with combinations of the actions listed here, such as OFFLOAD protocol processing followed by PROXY of a result of the protocol processing.

The packet is delivered to an appropriate Receive Queue. In one example, there is support for 1024 Receive Queues.

There is a tradeoff between the size of the n-tuple, the number of bits in the n-tuple, and the number of filters that can be supported. In one example it is possible to support 2048 132-bit n-tuples or 512 528-bit n-tuples. The 528-bit n-tuple is large enough to contain all the header fields extracted by the parser and is also large enough to contain parts of the packet payload. The 132-bit n-tuple is only large enough to contain a subset of the information extracted by the parser, and the 132-bit n-tuple which is referred to as a compressed n-tuple for this reason, employs a selection mechanism to select which fields are used in the n-tuple. The advantage of the larger tuples is the flexibility in specifying matching conditions and the advantage of the compressed n-tuple is that a greater number of filters that can be supported.

Figure 3:
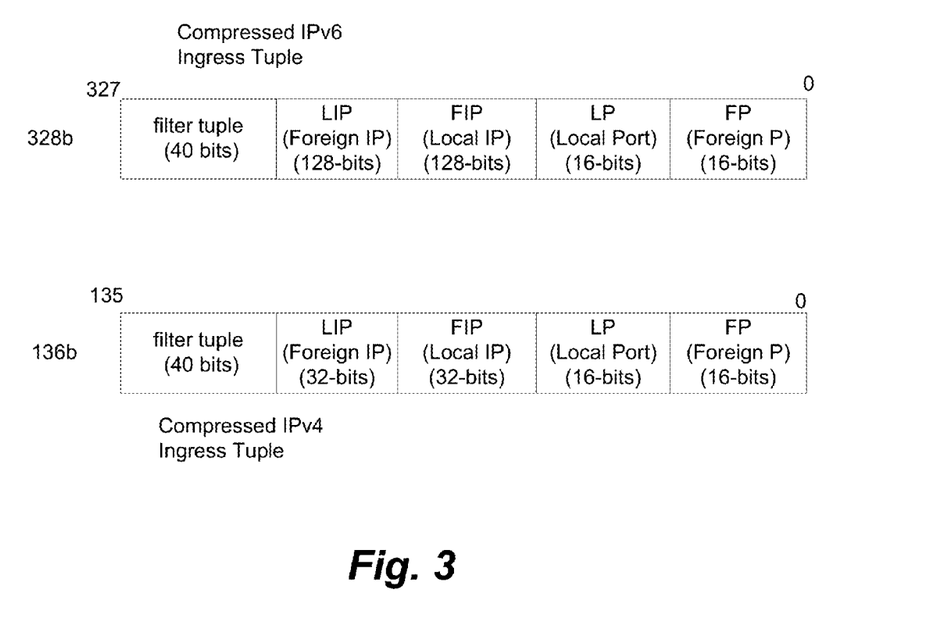
FIG. 3 illustrates compressed n-tuple formats usable for n-tuple classification.

A compressed n-tuple format used for n-tuple classification, for IPv4 and IPv6 may be as shown in FIG. 3. The parser extracts the type of a packet, e.g., IPv6, IPv4 or non-IP. The IPv6 packets use a 288+36=324 bit wide tuple, and all other packets use a 96+36=132 bit tuple, where 288 is the width in bits of the IPv6 4-tuple, 96 is the width in bits of the IPv4 4-tuple, and 36 is the width in bits of the filter tuple.

In one example, the filter tuple may be configured using a 9-bit mask and 1-bit compaction selector (e.g. using a programmable register), with the different fields of the tuple being as shown in the following table, and the value in the register that selects that field, i.e., when a bit is set in a column, the field in the column is part of the filter tuple. There are 84 possible non-compacted combinations of the tuple that fit within the 36 bits, and these are the legal configurations of the compacted filter tuple. The size of the filter tuple in the example embodiment is 36 bits. There are an additional 24 compacted compressed filter formats which may be selected with a mode bit in the configuration register.

Further efficiency can be achieved by constructing compacted forms of some of the fields in the n-tuple. For example a compacted IP Protocol field format uses a compacted representation of the IP protocol field to represent the most popular protocols or protocols of interest (e.g. ICMP, TCP and UDP), and this field includes an encoding for FCoE (Fibre Channel over Ethernet) and IP fragments. See Compacted PROTOCOL entry in table below.

TABLE 1

Compressed Classification Tuple Format
Programmable Register bits [9.0]
Programmable Register bit [15]==0, compact mode selector not enabled

| IP Fragment (1-bit) | MATCH TYPE (3-bits) | MATCH (1-bit) | EtherType (16-bits) | Protocol (8-bits) | TOS (8-bits) | iVLAN (17-bits) | VNIC ID (17-bits) | PORT (3-bits) | FCoE (1-bit) |
|---|---|---|---|---|---|---|---|---|---|
| 1 | 1 | 1 | 1 | 0 | 0 | 0 | 0 | 1 | 1 |
| 1 | 1 | 1 | 0 | 1 | 1 | 0 | 0 | 1 | 1 |
| 1 | 1 | 1 | 0 | 0 | 0 | 1 | 0 | 1 | 1 |
| 1 | 1 | 1 | 0 | 0 | 0 | 0 | 1 | 1 | 1 |
| 1 | 1 | 0 | 1 | 1 | 1 | 0 | 0 | 0 | 0 |
| 1 | 1 | 0 | 1 | 1 | 0 | 0 | 0 | 1 | 1 |
| 1 | 1 | 0 | 1 | 0 | 1 | 0 | 0 | 1 | 1 |
| 1 | 1 | 0 | 0 | 1 | 0 | 1 | 0 | 1 | 1 |
| 1 | 1 | 0 | 0 | 1 | 0 | 0 | 1 | 1 | 1 |
| 1 | 1 | 0 | 0 | 0 | 1 | 1 | 0 | 1 | 1 |
| 1 | 1 | 0 | 0 | 0 | 1 | 0 | 1 | 1 | 1 |
| 1 | 0 | 1 | 1 | 1 | 0 | 0 | 0 | 0 | 1 |
| 1 | 0 | 1 | 1 | 0 | 1 | 0 | 0 | 0 | 1 |
| 1 | 0 | 1 | 0 | 1 | 0 | 1 | 0 | 0 | 1 |
| 1 | 0 | 1 | 0 | 1 | 0 | 0 | 1 | 0 | 1 |
| 1 | 0 | 1 | 0 | 0 | 1 | 1 | 0 | 0 | 1 |
| 1 | 0 | 1 | 0 | 0 | 1 | 0 | 1 | 0 | 1 |
| 1 | 0 | 0 | 1 | 1 | 1 | 0 | 0 | 1 | 0 |
| 1 | 0 | 0 | 1 | 1 | 1 | 0 | 0 | 0 | 1 |
| 1 | 0 | 0 | 1 | 0 | 0 | 1 | 0 | 0 | 1 |
| 1 | 0 | 0 | 1 | 0 | 0 | 0 | 1 | 0 | 1 |
| 1 | 0 | 0 | 0 | 1 | 1 | 1 | 0 | 0 | 1 |
| 1 | 0 | 0 | 0 | 1 | 1 | 0 | 1 | 0 | 1 |
| 1 | 0 | 0 | 0 | 0 | 0 | 1 | 1 | 0 | 1 |
| 0 | 1 | 1 | 1 | 1 | 0 | 0 | 0 | 0 | 0 |
| 0 | 1 | 1 | 1 | 0 | 1 | 0 | 0 | 0 | 0 |
| 0 | 1 | 0 | 1 | 1 | 1 | 0 | 0 | 0 | 1 |
| 0 | 1 | 0 | 1 | 0 | 0 | 1 | 0 | 0 | 0 |
| 0 | 1 | 0 | 1 | 0 | 0 | 0 | 1 | 0 | 0 |
| 0 | 1 | 0 | 0 | 1 | 1 | 1 | 0 | 0 | 0 |
| 0 | 1 | 0 | 0 | 1 | 1 | 0 | 1 | 0 | 0 |
| 0 | 0 | 1 | 1 | 1 | 0 | 0 | 0 | 1 | 0 |
| 0 | 0 | 1 | 1 | 0 | 1 | 0 | 0 | 1 | 0 |
| 0 | 0 | 0 | 1 | 1 | 1 | 0 | 0 | 1 | 1 |
| 0 | 0 | 0 | 1 | 0 | 0 | 1 | 0 | 1 | 0 |
| 0 | 0 | 0 | 1 | 0 | 0 | 0 | 1 | 1 | 0 |
| 0 | 0 | 0 | 0 | 1 | 1 | 1 | 0 | 1 | 0 |
| 0 | 0 | 0 | 0 | 1 | 1 | 0 | 1 | 1 | 0 |

TABLE 2

Compacted Compressed Classification Tuple Format
Programmable Register bits [9.0]
Programmable Register bit [15]==1, compact mode selector enabled

| IP Fragment (1-bit) | MATCH TYPE (3-bits) | MATCH (1-bit) | EtherType (16-bits) | Compact Protocol (2-bits) | TOS (8-bits) | iVLAN (17-bits) | VNIC ID (17-bits) | PORT (3-bits) | FCoE (1-bit) |
|---|---|---|---|---|---|---|---|---|---|
| 0 | 1 | 1 | 1 | 1 | 1 | 0 | 0 | 0 | 0 |
| 0 | 1 | 1 | 1 | 1 | 0 | 0 | 1 | 0 | 0 |
| 0 | 1 | 1 | 1 | 1 | 0 | 0 | 0 | 1 | 0 |
| 0 | 1 | 1 | 1 | 0 | 1 | 0 | 0 | 1 | 0 |
| 0 | 1 | 1 | 1 | 0 | 0 | 0 | 1 | 1 | 0 |
| 0 | 1 | 1 | 0 | 1 | 1 | 1 | 0 | 0 | 0 |
| 0 | 1 | 1 | 0 | 1 | 1 | 0 | 1 | 1 | 0 |
| 0 | 1 | 1 | 0 | 1 | 0 | 1 | 1 | 0 | 0 |
| 0 | 1 | 1 | 0 | 1 | 0 | 1 | 0 | 1 | 0 |
| 0 | 1 | 1 | 0 | 0 | 1 | 1 | 0 | 0 | 0 |
| 0 | 1 | 1 | 0 | 0 | 0 | 1 | 1 | 1 | 0 |
| 0 | 1 | 0 | 1 | 1 | 1 | 0 | 1 | 1 | 0 |
| 0 | 1 | 0 | 1 | 1 | 0 | 1 | 0 | 0 | 0 |
| 0 | 1 | 0 | 1 | 0 | 0 | 1 | 0 | 1 | 0 |
| 0 | 1 | 0 | 0 | 1 | 1 | 1 | 1 | 0 | 0 |
| 0 | 1 | 0 | 0 | 1 | 1 | 1 | 0 | 1 | 0 |
| 0 | 1 | 0 | 0 | 1 | 0 | 1 | 1 | 1 | 0 |
| 0 | 1 | 0 | 0 | 0 | 1 | 1 | 1 | 1 | 0 |
| 0 | 0 | 1 | 1 | 1 | 1 | 0 | 0 | 1 | 0 |
| 0 | 0 | 1 | 1 | 1 | 0 | 0 | 1 | 1 | 0 |
| 0 | 0 | 1 | 0 | 1 | 1 | 1 | 0 | 1 | 0 |
| 0 | 0 | 1 | 0 | 1 | 0 | 1 | 1 | 1 | 0 |
| 0 | 0 | 0 | 1 | 1 | 0 | 1 | 0 | 1 | 0 |
| 0 | 0 | 0 | 0 | 1 | 1 | 1 | 1 | 1 | 0 |

Table 4, below, describes the fields in an example filter format.

TABLE 3

Filter Tuple Format

| Field | Width bits | Description |
|---|---|---|
| IP fragment | 1 | Ingress IPv4 or IPv6 packet is fragmented |
| MAC_MATCH_TYPE | 3 | Multipurpose switch (MPS) match type, see table below |
| MAC_IDX | 9 | MPS match index |
| ETH_TYPE | 16 | Ethernet type |
| PROTOCOL | 8 | 8b protocol field within IP header |
| Compact PROTOCOL | 2 | 0 - not used<br>1 - FCoE<br>2 - UDP (not fragmented)<br>3 - TCP (not fragmented) |
| TOS/Traffic Class | 8 | 8b IPv4 Type Of Server/IPv6 Traffic Class |
| IVLAN_VLD | 1 | Inner VLAN tag is valid |
| IVLAN | 16 | 16b Inner VLAN tag |
| VNIC_ID_VLD | 1 | Depending on bit setting |
| VNIC_ID | 16 | in TP_INPUT_CONFIG selects between an ID derived from VF_VLD, PF, VF or outer VLAN: |
| | 1 | VF_VLD |
| | 3 | PF |
| | 6 | unused |
| | 7 | VF |
| | 1 | OVLAN_VLD |
| | 16 | OVLAN |
| PORT | 3 | Port where packet arrive with a value of 0-3 denoting Ethernet ingress ports 0-3, and a value of 4-7 denoting loopback packets from a particular egress channel (channel 0 corresponding to 4, channel 1 to 5, 2 to 6, and 3 to 7) |

Table 5 shows an example of possible values for the match type field, which is generated by the L2 lookup step.

TABLE 4

MAC_MATCH_TYPE

| Value | Name | Comments |
|---|---|---|
| 0 | UCAST_CAM | The MAC address of the Ethernet frame is a unicast address and it hit in the MPS MAC address TCAM (Ternary Context Addressable Memory) and the MacIndex value will indicate the index of the CAM entry that was hit. |
| 1 | UCAST_HASH | The MAC address is a unicast address and it hit in the MPS MAC address hash on an entry marked valid. The MacIndex value will indicate the index of the entry in the per interface hash table, and the Interface field will indicate which per Interface hash table. |
| 2 | MCAST_CAM | The MAC address of the frame is a multicast address and it hit in the MPS MAC address CAM. See UCAST_CAM comments for further explanation. |
| 3 | MCAST_HASH | The MAC address of the frame is a multicast address and it hit in the MPS MAC address hash on an entry marked valid. See UCAST_HASH comments for further explanation. |
| 4 | PROM | The frame is received as a promiscuous frame. There is a promiscuous enable bit per interface in MPS, and there is a configuration bit for the precedence of the promiscuous mode classification decision. In this case the promiscuous frame classification decision is configured to have the lowest precedence, i.e. after all the above and BCAST. The frame is received because the interface where it arrived has promiscuous mode enabled, and the frame matched none of the other criteria. |

TABLE 4-continued

MAC_MATCH_TYPE

| Value | Name | Comments |
|---|---|---|
| 5 | HYPER_PROM | The frame is received as a promiscuous frame (see PROM above for contrast). In this case the precedence of the promiscuous mode classification is configured in MPS to have higher precedence than the CAM and HASH, but lower than BCAST. The frame is received because the interface where it arrived has promiscuous mode enabled, and the frame is not a broadcast frame. |
| 6 | BCAST | The MAC address is a broadcast address. |
| 7 | NOMATCH | This value is only returned in MPS debug mode and indicates that the frame matched no criteria. |

We now discuss examples of various ingress packets. For example, for the TCP connect request ingress packets, the server/control-plane will typically be asked to validate the connection request and to deny, reject, or accept the connect request. For offloaded connections (i.e., the TCP protocol processing is offloaded from a host protocol processing stack to the NIC), the TCP engine will look up the TCB (TCP Control Block) connection state, to access the queue number within the TCB state, to select the appropriate queue pair to use for TCP connections and iSCSI connections. For iWARP RDMA connections, the queue pair information is stored as part of the TCB state. Finally, for filter rules, the TCB state that is accessed using the index of the filter rule specifies if a packet that matches the rule should be dropped (DROP rule), should be passed (PASS rule) to the host, should be protocol processed (OFFLOAD rule) or should be proxied (PROXY rule) to a particular output port. In the PASS rule case the queue number that is stored as part of the TCB can be used to specify a receive queue to which the particular packet is steered. Alternatively, packets hitting a PASS rule can be distributed to multiple queues through RSS (Receive Side Scaling) mechanisms.

Creating Filter Rules

In one example, the filter rules are setup via a control plane message referred to as the SET_LE_REQ message with the type of command being a write command that initializes a filter entry within the filter region of the Lookup Engine (LE) TCAM; and with a control plane message referred to as a SET_TCB or SET_TCB_FIELD message that initializes the classification rule TCB.

In an example, the filter region within the LE may be set by programming the LE_DB_FILTER_TABLE_INDEX register, ensuring that the filter index is greater than the server index and less than the CLIP index. Note that the index of each region, in one example, must be a multiple of 128. The Filter region is then enabled by setting the corresponding bit in the LE_DB_CONFIG register.

The SET_LE_REQ message may be used to write the n-tuple information into the filter entry, using the LE_DB_WRITE command. Each filter can independently be configured to take precedence over hits in the Active and Server regions of the LE. This can be accomplished through accessing the priority filter configuration register.

Filter Rule

A filter rule may be implemented with a TCAM entry and a TCB entry corresponding to the tid of the filter rule.

Example TCB fields used for filter rules are shown in Table 6, and the rest of the TCB is set to zeros:

TABLE 5

Filter TCB RSS Flags

| Description | Comments |
|---|---|
| Filter | This bit must be set for all filter rules. |
| Report TID | When set, the RSS hash field will report the filter TID instead of the hash value. |
| Drop | When set, packets which match the filter rule are dropped. |
| Direct Steer | When set, packets which match the filter rule are direct steered, and follow the offloaded event configuration. Otherwise, a hash is computed and used in looking up the receive queue number, per tunnel packet configuration. |
| Mask Hash | When set, the computed hash is masked using the MaskValue specified in TP_RSS_CONFIG_TNL and OR'ed into the RSS field in the TCB, right extended by 1 bit of zero. Only applicable when Direct Steer is clear. |
| Direct Steer Hash | When set, the RSS field in the TCB is interpreted as a hash value, left extended by 1 bit of zero, regardless of the offload event settings. Otherwise, it is interpreted according to the offload event settings, e.g. as a final queue number. Only applicable when Direct Steer is set. |
| Count Hits | When set, filter hits and hit bytes are accounted in the TCB. |
| Loopback | Loop packets which hit this filter back to transmit. The loopback transmit channel number is specified below. Additional NAT support is configured per table below. |
| Loopback TX Channel | Transmit channel and interface (port) number for loopback packets. |
| Swap MAC addresses | Swap SMAC and DMAC addresses for loopback packet, before any rewrite operations. |
| Rewrite DMAC | Replace the incoming DMAC with the one pointed to by the TCB's l2t_index field, if the DMAC address value is non-zero. This applies to loopback frames only. |
| Rewrite SMAC | Replace the incoming SMAC with the one pointed to by the TCB's smac_sel field, if the SMAC address value is non-zero. This applies to loopback frames only. |
| Insert VLAN | If the VLAN tag in the L2T entry pointed to by the TCB's l2t_index field is not 12'hFFF, then the VLAN tag is inserted in the looped back packet. Note that VLAN rewrite corresponds to both InsertVLAN and RemoveVLAN being set. This applies to loopback frames only. |
| Remove VLAN | If the incoming packet has a VLAN tag then the VLAN tag is removed before the Packet is looped back. Note that VLAN rewrite corresponds to both InsertVLAN and RemoveVLAN being set. This applies to loopback frames only. |

Table 7 shows examples of Filter Loopback NAT flags.

TABLE 6

Filter Loopback NAT Flags

| | |
|---|---|
| NAT Mode | Specifies NAT mode for loopback filters:<br>Value    Setting<br>3'b000    No NAT performed<br>3'b001    Only DIP rewritten<br>3'b010    DIP/DP rewritten<br>3'b011    DIP/DP/SIP rewritten<br>3'b100    DIP/DP/SP rewritten<br>3'b101    SIP/SP rewritten<br>3'b110    DIP/SIP/SP rewritten<br>3'b111    All 4-tuple fields rewritten |
| NAT sequence check | When set, filter-based loopback with NAT enabled is only applied to segments satisfying the check: SEQ_LT(seq_no+pld_len,rcv_nxt) |
| NAT flag check | When set, filter-based loopback with NAT enabled is only applied to segments which do not have the TCP FIN flag or RST flag set. |

In one example, the addresses used in the NAT functionality are stored in the most significant 288 bits of the TCB as follows:

tcb[1023:1008]=SP
tcb[1007:992]=DP
tcb[991:960]=SIP4
tcb[959:928]=DIP4
tcb[991:864]=SIP6
tcb[447:320]=DIP6

Additionally, if the "NAT sequence check" flag is set, then only ingress TCP segments satisfying the SEQ_LT(seq_no+pld_len,rcv_nxt) check (relative to the rcv_nxt value in the TCB) are looped back. All other sequence numbers are sent to the host, steered as normal tunnel packets. A "tunnel packet" is a packet that is provided for protocol processing to a software protocol stack operating on the host. Furthermore, if the "NAT flag check" flag is set, then only ingress TCP segments with the TCP FIN and RST flags not set are looped back.

Filter Hit Count

A 64 bit hit count per filter is configurably maintained. The count is incremented for packets which do not fail the basic sanity checking (checksums etc. . . . ), and can be read by using a GET_TCB or a SET_TCB_FIELD with zero mask and data to access the count location in the TCB. It can also be written if need be using SET_TCB_FIELD.

A 64 bit hit byte count per filter is configurably maintained. The count is incremented for packets which do not fail the basic sanity checking (checksum etc. . . . ), by the length of the packet in bytes, and can be read by using a GET_TCB or a SET_TCB_FIELD with zero mask and data to access the count location in the TCB. It can also be written if need be using SET_TCB_FIELD.

We have thus described a system and method by which ingress packets—coming from the network—may be switched selectively to one or multiple destinations, and alternatively or additionally (in a NIC which is capable of replicating packets) back to one or multiple destinations on the network. In multi-port NICs, this capability effectively allows a NIC to perform the basic functions of a standalone network switch as well as additional useful functions.

What is claimed is:

1. Network interface circuitry configured to couple a host computer and a network, comprising:
   a plurality of ports configured to transmit packets to and receive packets from the network;
   a memory configured to facilitate receipt of data by the host, the data being at least a portion of the packets received;
   logic to, based on a least a portion of a packet received on one of the plurality of ports, indicate which destination of one of any one of the ports and the host to indicate as a destination of data of the packet, wherein indicating the destination as said one of said any of the ports is an indication that the data of the packet is to be transmitted back out to the network from the network interface circuitry via the indicated said port and wherein indicating the destination as the host is an indication that the data of the packet is to be provided to the host.

2. The network interface circuitry of claim 1, wherein:
   the network interface circuitry is configured to offload protocol processing from a host stack; and
   the logic includes logic to determine whether the network interface circuitry is to perform offload protocol processing with regard to the received packet.

3. The network interface circuitry of claim 1, wherein:
   the memory is configured to facilitate receipt of data by the host using a plurality of receive queues; and
   the indication of the host as the destination of the packet includes an indication of one of a plurality of receive queues by which the host receives the data of the packets.

4. The network interface circuitry of claim 1, wherein:
   the logic is further configured to cause rewrite of a header of the packet,
   whereby the network interface circuitry operates as a router for packets for which a header has been rewritten.

5. The network interface circuitry of claim 1, wherein:
   the logic is configured to rewrite at least one of both a layer two and layer three header, and only a layer three header, to thereby accomplish routing of the received packet.

6. The network interface circuitry of claim 1, wherein:
   when the destination is any one of the ports and the logic indicates that the network interface circuitry is to operate as a proxy for the data of the packet, the network interface circuitry is configured to interoperate over the network, with the network interface circuitry as an origin and a peer destination of a packet including the data, reachable via the destination port and over the network.

7. The network interface circuitry of claim 1, wherein the logic is further configured to selectively cause, based on indicating a destination of data of a packet, replication and multicast of the data of the packet.

8. The network interface circuitry of claim 1, wherein the logic is further configured to cause rewrite of a payload portion of the data of the packet.

9. The network interface circuitry of claim 1, wherein the logic is further configured to cause insertion of a tag in a header portion of the packet.

10. The network interface circuitry of claim 1, wherein the destination indication logic is responsive at least in part to a configuration area of the network interface circuitry that is configurable with values by software executing on the host computer.

11. The network interface circuitry of claim 6, wherein:
    the network interface circuitry is configured to offload protocol processing from a host stack to terminate a connection between the host and a first peer with respect to the received packet; and
    the logic includes logic to determine whether the network interface circuitry is to perform offload protocol processing with regard to the received packet and, further, whether the network interface circuitry is to operate as a proxy for the data of the protocol-processed packet, the network interface circuitry is configured to interoperate over the network, with the network interface circuitry as an origin and a peer destination of a packet including the data, reachable via the destination port and over the network.

12. The network interface circuitry of claim 6, wherein:
    the network interface circuitry is further configured to provide a copy of at least a portion of the received packet to the host.

13. The network interface circuitry of claim 1, wherein:
    the logic includes logic to replicate at least a portion of the data of the received packet resulting in at least one replicated packet, and the logic further includes logic to process the at least one replicated packet based at least in part on the data included in the at least one replicated packet.

14. The network interface circuitry of claim 13, wherein:
the logic includes logic to replicate at least a portion of the received packet resulting in at least one replicated packet includes logic to associate a virtual address as a layer 2 address for the at least one replicated packet, and
the logic further includes logic to process the at least one replicated packet based at least in part on the associated virtual address.

15. The network interface circuitry of claim 1, wherein:
the destination indication logic includes logic to process at least a portion of the packet and to selectively prevent, based thereon, the packet from being transmitted to the network from the network interface circuitry.

16. A method of coupling a host computer and a network, comprising:
via a plurality of ports of network interface circuitry that couples the host computer and the network, transmitting packets to and receiving packets from the network;
configuring a memory to facilitate receipt of data by the host, the data being at least a portion of the packets received; and
operating logic to, based on a least a portion of a packet received on one of the plurality of ports, indicate which destination of one of any one of the ports and the host to indicate as a destination of data of the packet, wherein indicating the destination as said one of said any of the ports is an indication that the data of the packet is to be transmitted back out to the network from the network interface circuitry via the indicated said port.

17. The method of claim 16, wherein:
the network interface circuitry is configured to offload protocol processing from a host stack; and
operating the logic includes operating the logic to determine whether the network interface circuitry is to perform offload protocol processing with regard to the received packet.

18. The method of claim 16, wherein:
operating the logic further includes operating the logic to cause rewrite of a header of the packet whereby the network interface circuitry operates as a router for packets for which a header has been rewritten.

19. The method of claim 16, wherein:
operating the logic further includes operating the logic to rewrite at least one of both a layer two and layer three header, and only a layer three header, to thereby accomplish routing of the received packet.

20. The method of claim 16, wherein operating the logic further includes operating the logic to selectively cause, based on indicating a destination of data of a packet, replication and multicast of the data of the packet.

21. The method of claim 16, wherein operating the logic further includes operating the logic to cause rewrite of a payload portion of the data of the packet.

22. The method of claim 16, wherein:
operating the logic further includes operating the logic to replicate at least a portion of the data of the received packet resulting in at least one replicated packet, and
operating the logic to process the at least one replicated packet based at least in part on the data included in the at least one replicated packet.

23. The method of claim 22, wherein:
operating the logic further includes operating the logic to replicate at least a portion of the received packet resulting in at least one replicated packet includes logic to associate a virtual address as a layer 2 address for the at least one replicated packet, and
operating the logic to process the at least one replicated packet based at least in part on the associated virtual address.

24. The method of claim 16, wherein:
operating the logic includes operating the logic to process at least a portion of the packet and to selectively prevent, based thereon, the packet from being transmitted to the network from the network interface circuitry.

25. Network interface circuitry configured to couple a host computer and a network, comprising:
a plurality of ports configured to transmit packets to and receive packets from the network;
a memory configured to facilitate receipt of data by the host, the data being at least a portion of the packets received;
logic to, based on a least a portion of a packet received on one of the plurality of ports, indicate which destination of one of any one of the ports and the host to indicate as a destination of data of the packet.

* * * * *